(12) United States Patent
Liu (10) Patent No.: US 9,237,210 B2
(45) Date of Patent: Jan. 12, 2016

(54) INTERNET ACCESS METHOD, TERMINAL AND STORAGE MEDIUM

(75) Inventor: Jing Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/346,205

(22) PCT Filed: Jul. 19, 2012

(86) PCT No.: PCT/CN2012/078859
§ 371 (c)(1),
(2), (4) Date: Mar. 20, 2014

(87) PCT Pub. No.: WO2013/044671
PCT Pub. Date: Apr. 4, 2013

(65) Prior Publication Data
US 2014/0222974 A1  Aug. 7, 2014

(30) Foreign Application Priority Data

Sep. 28, 2011 (CN) .......................... 2011 1 0297975

(51) Int. Cl.
*G06F 15/16* (2006.01)
*H04L 29/14* (2006.01)
*H04W 80/12* (2009.01)
*H04L 29/08* (2006.01)

(52) U.S. Cl.
CPC ................ *H04L 69/40* (2013.01); *H04L 67/28* (2013.01); *H04W 80/12* (2013.01); *H04L 67/04* (2013.01); *H04L 67/2814* (2013.01)

(58) Field of Classification Search
CPC ....................................................... H04L 69/40
See application file for complete search history.

(56) References Cited

U.S. PATENT DOCUMENTS 6,446,096 B1 * 9/2002 Holland et al. ............... 715/234
7,035,921 B1 * 4/2006 Baker .......................... 709/224
2002/0069241 A1 6/2002 Narlikar et al.
(Continued)

FOREIGN PATENT DOCUMENTS

| CN | 1853384 | 10/2006 |
| CN | 101800758 | 8/2010 |

(Continued)

OTHER PUBLICATIONS

Chinese Office Action mailed May 29, 2015.
(Continued)

*Primary Examiner* — Esther B Henderson
(74) *Attorney, Agent, or Firm* — Dilworth & Barrese, LLP.

(57) ABSTRACT

The present application relates to an Internet access method, a terminal and a storage medium. The method comprises transmitting a first webpage access-request to a second server via a first server; packaging address information of a webpage to be accessed into a second webpage access-request whose destination address is an address of a proxy server when the terminal confirms the first webpage access has failed and transmitting the second webpage access-request to the second server via the first server and the proxy server; and receiving a by the second server via the proxy server and the first server and presenting the returned webpage content. The present application can increases the reliability of accessing the Internet so as to improve the user experience of using the service.

5 Claims, 5 Drawing Sheets

(56) References Cited

U.S. PATENT DOCUMENTS

| | | |
|---|---|---|
| 2006/0064469 A1* | 3/2006 | Balasubrahmaniyan et al. .............................. 709/218 |
| 2008/0172679 A1* | 7/2008 | Shen et al. .................... 719/318 |
| 2009/0006612 A1 | 1/2009 | Asai |
| 2009/0156185 A1 | 6/2009 | Morin |
| 2010/0030880 A1 | 2/2010 | Joshi et al. |

FOREIGN PATENT DOCUMENTS

| | | |
|---|---|---|
| CN | 102137168 | 7/2011 |
| JP | 2002024191 | 1/2002 |

OTHER PUBLICATIONS

European Search Report mailed May 4, 2015.

* cited by examiner

INTERNET ACCESS METHOD, TERMINAL AND STORAGE MEDIUM

CROSS REFERENCE TO RELATED APPLICATION

The present application is based on and claims priority to Chinese Patent Application No. 201110297975.1, filed on Sep. 28, 2011, the present application of which is hereby incorporated by reference in its entirety.

TECHNICAL FIELD

The present application relates to a technology for mobile communication, and in particular, to an Internet accesses method, a terminal and a storage medium.

BACKGROUND ART

With the development of the communication technique and the wireless Internet technique, applications supporting mobile traffic through a terminal such as a mobile terminal are getting more and more popular. A user may access the Internet such as the mobile Internet, for example, through a mobile terminal, to search for information, publish and download songs, initiate instant messaging communication, and play Internet game or the like.

Figure 1:
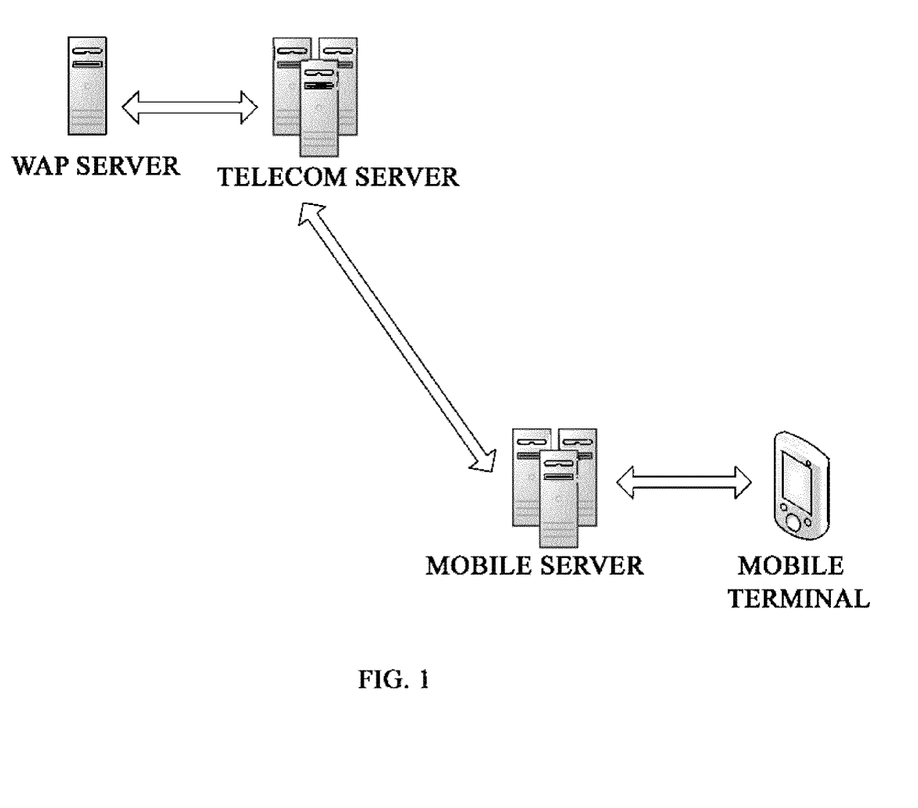
FIG. 1 is a diagram illustrating a configuration of a conventional Internet access system.

FIG. 1 is a diagram illustrating a configuration of a conventional system for accessing the mobile Internet. As shown in FIG. 1, the system includes a mobile terminal, a first server such as a mobile server (cluster), a second server such as a telecom server (cluster), and a third server such as a wireless application protocol (WAP) server. At first, the mobile terminal generates a webpage access-request based on a webpage to be accessed, and transmits the generated webpage access-request to the mobile server. The mobile server receives the webpage access-request from the mobile terminal and then performs a predetermined process on the webpage access-request according to an access policy set in advance. The predetermined process includes, For example, determining whether or not the mobile terminal is allowed to access the webpage and transmitting the webpage access-request to a corresponding telecom server if such webpage access-request is allowed. The telecom server transmits the received webpage access-request to the WAP server. In response to the received webpage access-request, the WAP server attaches corresponding webpage information (WAP webpage content) to the response to the webpage access-request and transmits the response to the mobile terminal via the telecom server and the mobile server. After receiving the response to the webpage access-request, the mobile terminal parses the response to obtain the WAP webpage content and then present the obtained webpage content to the user.

In the system above, the mobile terminal communicates with the mobile server wirelessly. The mobile server serves as a gateway to filter the received webpage access-requests. There are wired or wireless connections between the mobile server, the telecom server and the WAP server.

In the conventional mobile Internet accessing system, the mobile server connects to the telecom server through a wireless or wired channel. If a network failure, such as network congestion between operators, connection interruption, the mobile server entering maintenance or being overloaded, or the mobile server blocking the mobile terminal from accessing the network according to a predefined access policy, occurs between the mobile server and the telecom server, the access-request may be failed and a message indicating that the network service is currently not available (503) and including a possible reason for the failure may be returned. The reason may be, for example, a temporary failure to connect to the target website temporarily failing to be connected to, the server entering maintenance or being overloaded, and the server unable to support the function being requested, and so on. Even if the mobile terminal retransmits a webpage access-request is ted, the same message that the service is currently not available (503) may be received. This not only reduces the operating reliability of the mobile Internet access system but also takes more time for the user to access the Internet, thereby deteriorating user experience of accessing mobile Internet.

SUMMARY OF INVENTION

In light of so, the present application proposes a method of accessing the Internet, a terminal and a storage medium, which can increase the reliability of the mobile Internet access system and improve the user experience when accessing the mobile Internet.

According to an embodiment of the present application, there is provided a terminal. The terminal comprises a webpage access-request module, a domain access failure management module, and a webpage access-request processing module. The webpage access-request module is configured to transmit a first webpage access-request to a second server via a first server. The domain access failure management module is configured to package address information of a webpage to be accessed into a second webpage access-request whose destination address is an address of a proxy server when the terminal confirms the first webpage access has failed and transmit the second webpage access-request to the second server via the first server and the proxy server. The webpage access-request processing module is configured to receive a by the second server via the proxy server and the first server and present the returned webpage content.

Further, according to an embodiment of the present application, there is provided an Internet access method. The method comprises: transmitting a first webpage access-request to a second server via a first server; packaging address information of a webpage to be accessed into a second webpage access-request whose destination address is an address of a proxy server when the terminal confirms the first webpage access has failed and transmitting the second webpage access-request to the second server via the first server and the proxy server; and receiving a by the second server via the proxy server and the first server and presenting the returned webpage content.

Further, according to an embodiment of the present application, there is provided a storage medium containing computer-executable instructions which are executed by a computer to implement an Internet access method, said method comprises: transmitting a first webpage access-request to a second server via a first server; packaging address information of a webpage to be accessed into a second webpage access-request whose destination address is an address of a proxy server when the terminal confirms the first webpage access has failed and transmitting the second webpage access-request to the second server via the first server and the proxy server; and receiving a by the second server via the proxy server and the first server and presenting the returned webpage content.

In view of the technical solutions described above, the present application provides an Internet access method, a terminal and a storage medium. With the configuration of the present application, after the terminal confirms the first webpage access has failed, it packages address information of a webpage to be accessed into the second webpage access-request whose destination address is an address of a proxy server and transmits the second webpage access-request to the second server via the first server and the proxy server, and then receives a by the second server via the proxy server and the first server and presents the returned webpage content. To do this, when the first webpage access-request cannot reach the destination, a solution for eliminating a gateway type error by using the proxy server is proposed. The solution effectively eliminates the stability problem occurring in directly accessing to the Internet and increases the reliability of accessing the Internet. Further, when there is network congestion among some network operators, the solution can effectively speed up the access to the Internet and reduce the time for the user to access the Internet by using the proxy server to forward the request, thereby improving user experience of accessing mobile Internet.

BRIEF DESCRIPTION OF THE DRAWINGS

The description above is the summary of the present application. In order to describe the embodiments of the present application more clearly so that the person skilled in the art can implement the present application according the present specification and to make the technical solution and advantages of the application more apparent and intelligible, a more detailed description of the application will be given below in conjunction with the embodiment and the accompanying drawings.

DETAILED DESCRIPTION

Hereinafter, in order to further illustrate the technical means and function of the present application, specific implementations, configurations, features and functions of the Internet access method, the terminal, and the storage medium according to the present application are described in detail in connection with the drawings and embodiments.

The foresaid and other technical contents, features and advantage of the present application will become more apparent from the following detailed description when read in conjunction with the accompanying drawings. The specific technical means and advantages of the present application can be more clearly understood from the following detailed description. The accompanying drawings are only referred to illustrate the present application, not to limit the present application.

In an existing Internet access system, such as a mobile Internet access system, if a network failure occurs between a first server, such as a mobile server, and a second server, such as a telecom server while communications among other servers are normal, or if the mobile server blocking a terminal device, such as the mobile terminal, from accessing the network according to a predefined access policy, an access-request from the mobile request may fail. In the embodiment according to the present application, in case that the mobile terminal connects to a third server such as a WAP server, that is, in case that the mobile terminal connects to the WAP server sequentially via the mobile server and telecom server, if network error, such as an operator's gateway error (503) occurs, the internet access system according to the present application can cause a proxy server to connect to the mobile server and the telecom server in a wireless or wired channel so that, when a network failure (503) between the mobile server and the telecom server occurs, the proxy server performs forwarding process to eliminate network congestion among some operators and provide the users with network service. The first server, the second server, and the third server may be located in different networks belonging to different network operators. The first server, the second server, and the third server may be, for example, the mobile server, telecom server and WAP server, respectively.

Figure 2:
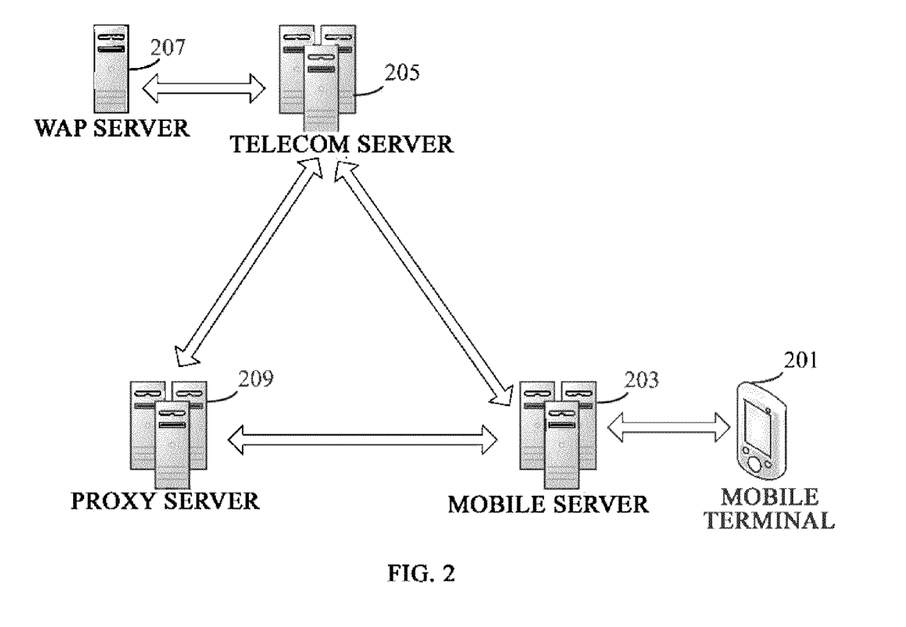
FIG. 2 is a diagram illustrating a configuration of an Internet access system according to an embodiment of the present application.

FIG. 2 is a diagram illustrating a configuration of an Internet access system according to an embodiment of the present application. As shown in FIG. 2, the system includes a terminal such as the mobile terminal 201, a first server such as the mobile server 203, a second server such as the telecom server 205, a third server, such as the WAP server 207 and a proxy server 209.

The mobile terminal 201 transmits a first webpage access-request to the WAP server 207 via the mobile server 203 and the telecom server 205. After confirming that the first webpage access-request by a direct connection has failed, the mobile terminal 201 packages the address information of the webpage to be accessed into a second webpage access-request whose destination address is an address of the proxy server 209 and transmits the second webpage access-request to the mobile server 203. Finally, the mobile terminal 201 receives a WAP webpage content returned by the WAP server 207 and then presents the returned webpage content.

The mobile server 203 receives the second webpage access-request from the mobile terminal 201, and transmits the second webpage access-request whose destination address is the address of the proxy server to the proxy server 209 based on the destination address information included in the second webpage access-request.

The proxy server 209 parses the received second webpage access-request from the mobile terminal 203 to obtain the address information of the webpage packaged in the second webpage access-request and transmits the webpage access-request to the telecom server 205.

The telecom server 205 receives the second webpage access-request and transmits the received second webpage access-request to the WAP server 207.

In response to the received second webpage access-request, The WAP server 207 generates a corresponding WAP webpage content and returns the WAP webpage content to the mobile terminal 201 sequentially via the telecom server 205, the proxy server 209 and the mobile server 203.

In the embodiment according to the present application, the mobile terminal 201 connects to the mobile server 203 wirelessly, and the proxy server 209 connects to the mobile server 203 and the telecom server 205 in a wireless or wired channel. The wireless channel includes Wireless Fidelity (WIFI). The mobile server 203, the telecom server 205 and the WAP server 207 have the same functions as those of the existing mobile server, telecom server and WAP server. The mobile server 203, the telecom server 205 and the proxy server 209 can be provided separately or in a server cluster.

From the description above, With the configuration of the present application, the mobile terminal packages the address information of the webpage to be accessed into the second webpage access-request whose destination address is the address of the proxy server after confirming that accessing webpage in a direct connection mode has failed and transmits the second webpage access-request to the mobile server, and then parses a returned response from the mobile server to obtain WAP webpage content contained in the response and then present the obtained webpage content to the user. The mobile server receives the second webpage access-request from the mobile terminal, and forwards the second webpage access-request to the proxy server based on the destination address information included in the second webpage access-request. The proxy server receives and parses the second webpage access-request from the mobile terminal to obtain the webpage address information packaged in the second webpage access-request and transmit the second webpage access-request to the telecom server. The telecom server receives the second webpage access-request and transmits the received second webpage access-request to the corresponding WAP server based on the webpage address information included in the second webpage access-request. In response to the received second webpage access-request, the WAP server includes corresponding WAP webpage content in the response to the second webpage access-request and transmits the response to the mobile terminal via the telecom server, the proxy server and the mobile server. To do this, if the first webpage access-request cannot reach its destination due to a network fault between the mobile server and the telecom server or a filtering function of the mobile server, a solution for eliminating a gateway type error by using the proxy server is proposed. The solution effectively eliminates the stability problem occurring in directly accessing to the Internet and increases the reliability of accessing the Internet. Further, when there is network congestion among some network operators, the proxy server solution of the present application can effectively speed up the access to the Internet and reduce the time for the user to access the Internet by using the proxy server to forward the request, thereby improving user experience of accessing mobile Internet.

Figure 3:
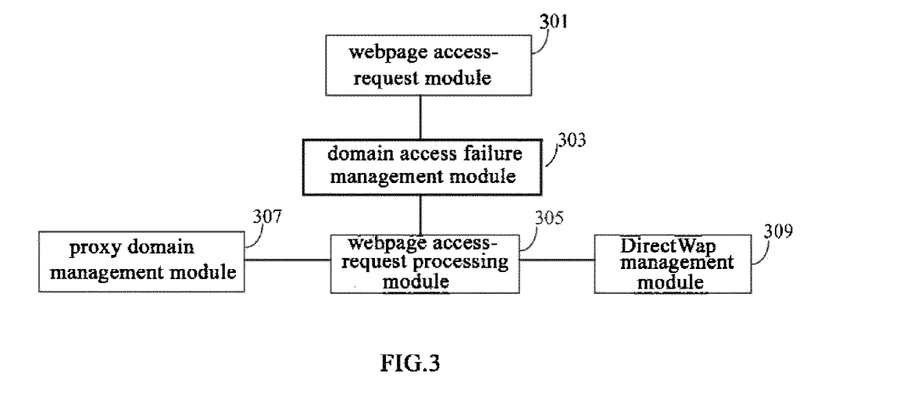
FIG. 3 is a diagram illustrating a main infrastructure of a terminal according to the embodiment of the present application.

FIG. 3 is a diagram illustrating a main infrastructure of a terminal according to the embodiment of the present application. As shown in FIG. 3, the terminal according to the embodiment of the present application includes a webpage access-request module 301, a domain access failure management module 303, and a webpage access-request processing module 305.

The webpage access-request module 301 is configured to transmit the webpage access-request to the second server via the first server.

The first server and the second server can be provided in different networks belonging to different network operators. The first server and the second server may be, for example, the mobile server, telecom server, WAP server and so on.

The domain access failure management module 303 is configured to package address information of a webpage to be accessed into a second webpage access-request whose destination address is an address of a proxy server and transmit the webpage access-request to the second server via the first server and the proxy server when the terminal confirms the first webpage access has failed.

The domain access failure management module 303 outputs the webpage access-request after confirming the webpage data requested by the user and receives the response to the webpage access-request. The domain access failure management module 303 further parses the response to the webpage access-request and presents the webpage data content included in the response. Further, the domain access failure management module 303 can continue to obtain a sub-resource associated with the webpage via the proxy server, for example, pictures and Cascading Style Sheets (CSS) of WAP 2.0 or the like. In addition, when confirming that the user accesses the picture data, the domain access failure management module 303 outputs the webpage access-request, receives the response to the webpage access-request, and then parses the response to the webpage access-request to present the picture data content included in the response.

In some embodiments, accessing to the picture data can be identified by setting a field of eReqType=EREQ_FAIL_RETRY in the request protocol corresponding to the webpage access-request (HTTP access-request) and letting the field equal to 1.

The webpage access-request processing module 305 is configured to receive and present the webpage content returned by the second server via the proxy server and the first server.

Preferably, after a webpage access-request is transmitted in a direct connection mode and a prompt message that a service is not available is received, the domain access failure management module 303 further stores the domain information of the destination website included in the webpage access-request.

In the embodiment of the present application, the domain access failure management module 303 puts and stores the failed domain of the current HTTP access-request (including IP address) into a temporary failure domain list set in advance.

When the first webpage access-request is issued, the webpage access-request processing module 305 queries whether or not the domain access failure management module 303 stores the domain information corresponding to the webpage access-request. If the domain access failure management module 303 stores the domain information, the webpage access-request processing module 305 packages the address information of the webpage to be accessed into the second webpage access-request whose destination address is the address of the proxy server. Otherwise, according to the existing routine, the webpage access-request processing module 305 packages the address information of the webpage to be accessed, as the destination address, into the first webpage access-request.

In the embodiment of the present application, whenever the terminal issues a HTTP access-request, if the temporary failure domain list of the domain access failure management module 303 includes domain information (IP address) of the Uniform Resource Locator (URL) corresponding to the HTTP access-request, it is determined that the accessing to webpage in an existing direct connection mode is failed and a proxy server is needed.

In some embodiments, since the number of domains to which a user accesses per day is limited, the temporary failure domain list can be matched accurately. That is, the terminal keeps the number of domains in the temporary failure domain list below a maximum number which is, for example, 100. When inputting a new domain in the temporary failure domain list, the terminal determines whether or not the temporary failure domain list is full. If the temporary failure domain list is full, the terminal updates the temporary failure domain list according to a ranking mode based on the access time and the first-in first-out principle.

Preferably, the domain access failure management module 303 further clears the information stored in the temporary failure domain list when a browser of the terminal is closed.

Alternatively, when being implemented actually, the domain access failure management module 303 can clear the domain and IP address information in the temporary failure domain list at a preset interval or at a predetermined time when a new access to network is initiated. Alternatively, the domain access failure management module 303 can clear the domain information that is listed in the temporary failure domain list for a time more than a predetermined period.

Preferably, the terminal further comprises a proxy domain management module 307.

When the terminal is powered on, the proxy domain management module 307 reads proxy domain white list information from a preset configuration server and stores the read white list.

In the embodiment of the present application, the proxy domain white list includes one or more proxy domains which are maintained by a backend configuration server. The proxy domain white list in a configuration protocol can be sent through the configuration protocol, and in the configuration protocol, if a type (EDomainType) is Req BROKER=12, it indicates that the configured proxy domain white list is sent.

When the first webpage access-request is issued, the webpage access-request processing module 305 queries whether or not domain information corresponding to the first webpage access-request is included in the proxy domain white list of the proxy domain management module 307. If domain information corresponding to the first webpage access-request is included in the proxy domain white list, the webpage access-request processing module 305 packages the address information of the webpage to be accessed into the second webpage access-request whose destination address is the address of the proxy server. Otherwise, according to the existing routine, the webpage access-request processing module 305 packages the address information of the webpage to be accessed, as the destination address, into the first webpage access-request.

Preferably, the proxy domain white list is queried in a Fuzzy matching mode. For example, if the domain of a HTTP access-request is "house*.3g.qq.com", the domain information such as "house1.3g.qq.com", "house2.3g.qq.com" or the like stored in the proxy domain white list can be hit by querying the proxy domain white list. That is, the proxy server is needed if the user wants to access the house1.3g.qq.com and house2.3g.qq.com.

In some embodiments, the terminal may further include a direct access domain (DirectWap) management module 309.

If the first webpage access-request is transmitted through a direct connection mode and the relevant webpage content such as the WAP webpage content information is received, the direct access domain management module 309 stores the domain information of destination website included in the first webpage access-request in a direct access domain white list.

When the first webpage access-request is issued, the webpage access-request processing module 305 queries whether or not the direct access domain management module 309 stores domain information corresponding to the first webpage access-request. If the direct access domain management module 309 does not store the domain information, the webpage access-request processing module 305 packages the address information of the webpage to be accessed into the second webpage access-request whose destination address is the address of the proxy server. Otherwise, according to the existing routine, the webpage access-request processing module 305 packages the address information of the webpage to be accessed, as the destination address, into the first webpage access-request.

The terminal can locally maintain the direct access domain white list, the number of the direct access domain in the white list up to 100. When the backend configuration server (e.g. mobile server) configures one or more domains and adds them in the direct access domain white list, the direct access domain white list locally maintained by the terminal is updated. The terminal saves the updated direct access domain white list when the browser is closed, and loads the updated direct access domain white list upon a next starting of the browser.

Further, the terminal can hold simultaneously the temporary failure domain list, the proxy domain white list and the direct access domain white list. In this way, the domain corresponding to the HTTP access-request may be simultaneously stored in three lists or two lists. Thus, in the embodiment of the present application, when the webpage access-request processing module 305 is set to query the domain information corresponding to the webpage access-request, a priority of the querying can be set in an order: the proxy domain white list shall be queried first, that is, the priority of the proxy domain white list is the highest, the priority of the temporary failure domain list is the second highest and the priority of the direct access domain white list is the lowest Further, an identifier can be set in the transmission protocol of the webpage access-request and the identifier indicates whether the access to the Internet based on the webpage access-request via the proxy server is performed due to an access failure or a preset access policy of directly using the proxy server.

In this way, whenever the terminal accesses the Internet, an identifier field eReqTyp can be added in the protocol. The field can be defined in the structure body of BROKER RequestParam, and the setting can be given a value as follows:

EREQ_NORMAL=0, which is a default value indicating a direct access mode;

EREQ_FAILRETRY=1, which indicates that the access to the Internet is realized by using the proxy server after an access is failed;

EREQ_BROKER=2, which indicates that the access to the Internet is realized directly by the preset proxy server, that is, the domain information corresponding to the webpage access-request is included in the proxy domain white list.

From the description above, with the configuration of the present application, after the terminal confirms the first webpage access has failed, it packages address information of a webpage to be accessed into a second webpage access-request whose destination address is an address of a proxy server and transmits the webpage access-request to the second server via the first server and the proxy server, and then receives a by the second server via the proxy server and the first server and presents the returned webpage content. To do this, when the first webpage access-request cannot reach the destination, a solution for eliminating a gateway type error by using the proxy server is proposed. The solution effectively eliminates the stability problem occurring in directly accessing to the Internet and increases the reliability of accessing the Internet. Further, when there is network congestion among some network operators, the solution can effectively speed up the access to the Internet and reduce the time for the user to access the Internet by using the proxy server to forward the request, thereby improving user experience of accessing mobile Internet.

Figure 4:
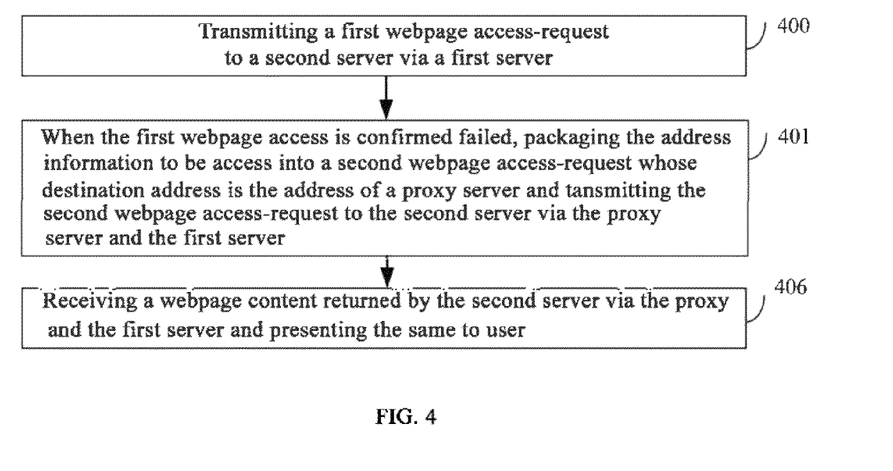
FIG. 4 is a flow chart of an Internet access method according to the embodiment of the present application.

FIG. 4 is a flow chart of an Internet access method according to the embodiment of the present application. This method can be carried out by a computer and can be stored in a one or more storage medium containing computer-executable instructions. As shown in FIG. 4, the flow of the method comprises the following steps.

At step 400, the terminal device, such as a mobile terminal or the like, transmits a first webpage access-request to the second server via the first server.

At step 400, the first server and the second server can be provided in different networks belonging to different network operators. The first server and the second server may be, for example, the mobile server, telecom server, WAP server and so on.

At step 401, when the terminal confirms the webpage access has failed, the address information of the webpage to be accessed is packaged into the second webpage access-request whose destination address is the address of the proxy server and then transmitted to the second server via the first server and the proxy server.

In step 401, the webpage access-request is an HTTP (Hyper Text Transfer Protocol) access-request.

The step 401 further comprises the following sub-steps: it is determined that the direct connection webpage access is failed if a prompt information that a service corresponding to the first webpage access-request is not available is received or a response to the first webpage access-request is not received after a preset time threshold after the first webpage access-request is issued.

Generally, it will take a long time to receive prompt information that the service corresponding to the webpage access-request is not available. Therefore, in the embodiment of the present application, in order to increase the effectiveness of accessing webpage, a timer can be provided in the terminal and started when a direct connection webpage access-request is issued by the terminal.

If a response to the first webpage access-request is not received after a preset time threshold after the webpage access-request is issued, it indicates that the first webpage access has failed, and the reason that the webpage access is failed may include that the connection is turned off because the mobile server (gateway) refuses the access, the WAP server (website) refuses the access, or the terminal cannot connect to the website due to a network failure. In case that the webpage access is failed, the address information of the webpage to be accessed is packaged into the second webpage access-request whose destination address is the address of the proxy server.

If the response to the first webpage access-request is not received twice after the preset time threshold, it is determined that the first webpage access has failed. The reason for the failure webpage access may include a slow processing speed of the website or a slow data communication of network. In case that the webpage access is failed, the address information of the webpage to be accessed is packaged into the second webpage access-request whose destination address is the address of the proxy server.

Further, after receiving the prompt information that the service is not available, the terminal determines whether or not the webpage to be accessed is a World Wide Web (WWW) page. If the webpage to be accessed is the WWW page, whether or not a non-switchable network mode is set is ascertained. If the non-switchable network mode is set, the webpage access-request is not set to use the proxy server. If the webpage to be accessed is not the WWW page or the non-switchable network mode is not set, the webpage access-request is set to use the proxy server.

Alternatively, the Internet is accessed not via the proxy server if the type of the access is one of a downloading, uploading, and Cascading Style Sheet (CSS) direct connection.

Below, the determination process of the WWW page type will be described.

(1) ascertaining the doctype field and meta field in the webpage data:

If the fields contain Wireless Markup Language (WML), it is determined that the page data is a WAP1.0 page (not WWW page);

If the fields contain Hyper Text Markup Language (HTML) and if the fields contain !DOCTYPE and xhtml-mobile fields or <meta and MobileOptimize fields, the page data is a WAP2.0 page; otherwise, the page data is the WWW page.

(2) ascertaining a content-type field in a HTTP response head:

If the field contains "vnd.wap.wml" or "text/vnd.wap.wml", it is determined that the page data is the WAP1.0 page;

If the field contains "vnd.wap.xhtml+xml" or "application/vnd.wap.xhtml+xml", it is determined that the page data is the WAP2.0 page.

(3) ascertaining the URL of the page:

If the URL information of the page contains "http://wap.", "https://wap.", "http://3g.", "http://3g.", "http://m." or "https://m.", it is determined that the page data is the WAP2.0 page.

(4) if the type of the page is text/html, it is determined that the page is the WWW page.

Packaging the address information of the webpage to be accessed into the second webpage access-request whose destination address is the address of a proxy server includes setting eReqType=EREQ_BROKER in the protocol field corresponding to the webpage access-request and letting it equal to 2 to indicate that the second webpage access-request need be transferred by the proxy server.

At step 406, the terminal receives the webpage content returned by the second server via the proxy server and the first server, and presents the same.

From the description above, with the configuration of the present application, after the terminal confirms the webpage access has failed, it packages address information of a webpage to be accessed into a second webpage access-request whose destination address is an address of a proxy server and transmits the second webpage access-request to the second server via the first server and the proxy server, and then receives a by the second server via the proxy server and the first server and presents the returned webpage content. To do this, when the first webpage access-request cannot reach the destination, a solution for eliminating a gateway type error by using the proxy server is proposed. The solution effectively eliminates the stability problem occurring in directly accessing to the Internet and increases the reliability of accessing the Internet. Further, when there is network congestion among some network operators, the solution can effectively speed up the access to the Internet and reduce the time for the user to access the Internet by using the proxy server to forward the request, thereby improving user experience of accessing mobile Internet.

Figure 5:
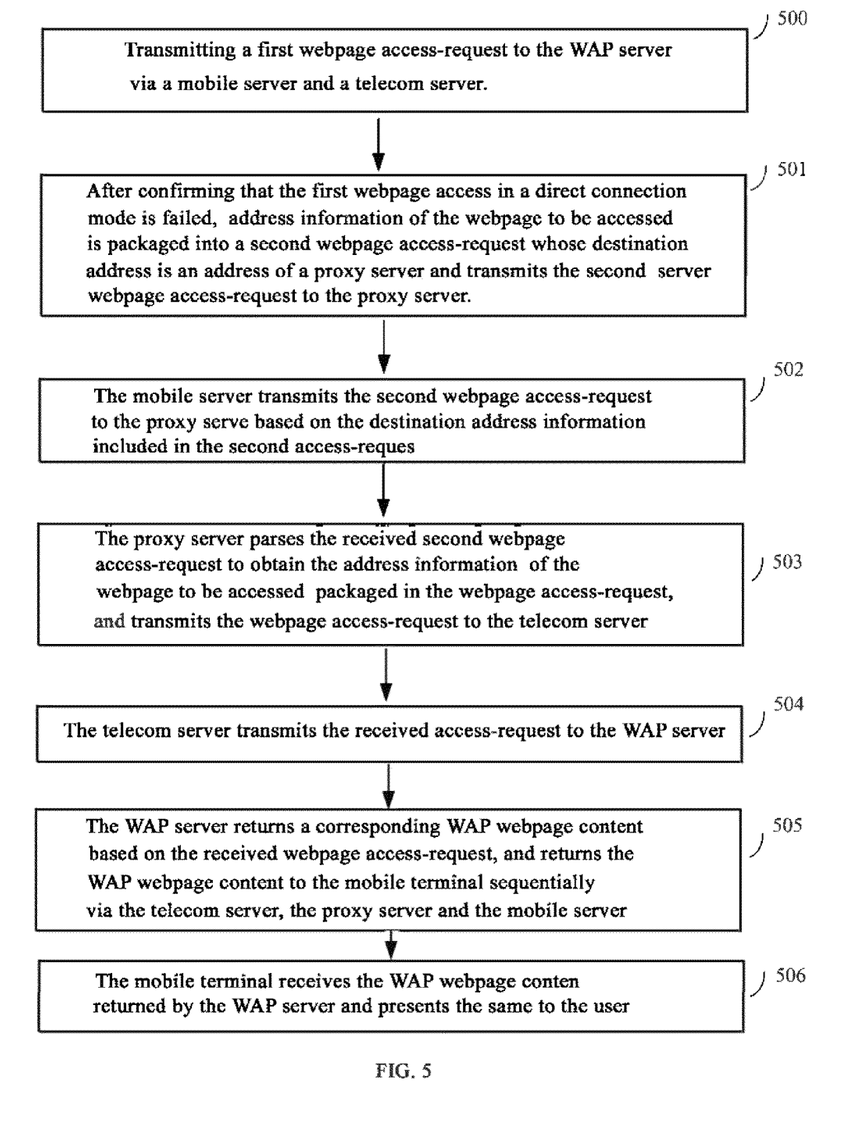
FIG. 5 is a flow chart of an Internet access method according to another embodiment of the present application

FIG. 5 is a flow chart of an Internet access method according to another embodiment of the present application. As shown in FIG. 5, the first server and the second server may be, for example, the mobile server and the WAP server, respectively. The flow comprises the following steps.

At step 500, the terminal transmits the first webpage access-request to the WAP server via the mobile server and the telecom server.

At step 501, when the terminal confirms the first webpage access has failed, the address information of the webpage to be accessed is packaged into the second webpage access-request whose destination address is the address of the proxy server and then transmitted to the mobile server At step 501, the webpage access-request is a Hyper Text Transfer Protocol (HTTP) access-request.

Specifically, the step 501 further includes: it is determined that the direct connection webpage access is failed if a prompt information that a service corresponding to the first webpage access-request is not available is received or a response to the first webpage access-request is not received after a preset time threshold after the first webpage access-request is issued.

Generally, it will take a long time to receive prompt information that the service corresponding to the first webpage access-request is not available. Therefore, in the embodiment of the present application, in order to increase the effectiveness of accessing webpage, a timer can be provided in the terminal and started when a direct connection webpage access-request is issued by the terminal.

If a response to the first webpage access-request is not received after a preset time threshold after the first webpage access-request is issued, it indicates that the first webpage access has failed, and the reason that the first webpage access is failed may include that the connection is turned off because the mobile server (gateway) refuses the access, the WAP server (website) refuses the access, or the terminal cannot connect to the website due to a network failure. In case that the webpage access is failed, the address information of the webpage to be accessed is packaged into the second webpage access-request whose destination address is the address of the proxy server.

If the response to the first webpage access-request is not received twice after the preset time threshold, it is determined that the first webpage access has failed. The reason for the failure webpage access may include a slow processing speed of the website or a slow data communication of network. In case that the webpage access is failed, the address information of the webpage to be accessed is packaged into the second webpage access-request whose destination address is the address of the proxy server.

Further, after receiving the prompt information that the service is not available, the terminal determines whether or not the webpage to be accessed is a World Wide Web (WWW) page. If the webpage to be accessed is the WWW page, whether or not a non-switchable network mode is set is ascertained. If the non-switchable network mode is set, the webpage access-request is not set to use the proxy server. If the webpage to be accessed is not the WWW page or the non-switchable network mode is not set, the webpage access-request is set to use the proxy server.

Alternatively, the Internet is accessed not via the proxy server if the type of the access is one of a downloading, uploading, and Cascading Style Sheet (CSS) direct connection.

Below, the determination process of the WWW page type will be described.

(1) ascertaining the doctype field and meta field in the webpage data:

If the fields contain Wireless Markup Language (WML), it is determined that the page data is a WAP1.0 page (not WWW page);

If the fields contain Hyper Text Markup Language (HTML) and if the fields contain !DOCTYPE and xhtml-mobile fields or <meta and MobileOptimize fields, the page data is a WAP2.0 page; otherwise, the page data is the WWW page.

(2) ascertaining a content-type field in a HTTP response head:

If the field contains "vnd.wap.wml" or "text/vnd.wap.wml", it is determined that the page data is the WAP1.0 page;

If the field contains "vnd.wap.xhtml+xml" or "application/vnd.wap.xhtml+xml", it is determined that the page data is the WAP2.0 page.

(3) ascertaining the URL of the page:

If the URL information of the page contains "http://wap.", "https://wap.", "http://3g.", "http://3g.", "http://m." or "https://m.", it is determined that the page data is the WAP2.0 page.

(4) if the type of the page is text/html, it is determined that the page is the WWW page.

Packaging the address information of the webpage to be accessed into the second webpage access-request whose destination address is the address of a proxy server includes setting eReqType=EREQ_BROKER in the protocol field corresponding to the webpage access-request and letting it equal to 2 to indicate that the second webpage access-request need be transferred by the proxy server.

At step 502, the mobile server transmits the second webpage access-request to the proxy server based on the destination address information included in the webpage access-request.

At step 502, the mobile server parses the protocol field used by the webpage access-request to determine whether or not an eReqType=EREQ_BROKER is set in the protocol field and its value is equal to 2. If yes, it indicates that the second webpage access-request need be forwarded by the proxy server.

At step 503, the proxy server parses the received second webpage access-request to obtain the address information of the webpage to be accessed packaged in the second webpage access-request, and transmits the webpage access-request to the telecom server.

At step 504, the telecom server transmits the received second webpage access-request to the WAP server.

At step 505, in response to the received second webpage access-request, the WAP server returns a corresponding WAP webpage content, and transmits the WAP webpage content to the terminal device such as the mobile terminal sequentially via the telecom server, the proxy server and the mobile server.

At step 506, the terminal device such as the mobile terminal receives the WAP webpage content returned by the WAP server and presents the same.

From the description above, With the configuration of the present application, the mobile terminal packages the address information of the webpage to be accessed into the second webpage access-request whose destination address is the address of the proxy server after confirming that accessing webpage in a direct connection mode has failed and transmits the second webpage access-request to the mobile server, and then parses a returned response from the mobile server to obtain WAP webpage content contained in the response and then present the obtained webpage content to the user. The mobile server receives the second webpage access-request from the mobile terminal, and forwards the second webpage access-request to the proxy server based on the destination address information included in the webpage access-request. The proxy server receives and parses the second webpage access-request from the mobile terminal to obtain the webpage address information packaged in the webpage access-request and transmit the webpage access-request to the telecom server. The telecom server receives the webpage access-request and transmits the received webpage access-request to the corresponding WAP server based on the webpage address information included in the second webpage access-request. In response to the received second webpage access-request, the WAP server includes corresponding WAP webpage content in the response to the second webpage access-request and transmits the response to the mobile terminal via the telecom server, the proxy server and the mobile server. To do this, if the first webpage access-request cannot reach its destination due to a network fault between the mobile server and the telecom server or a filtering function of the mobile server, a solution for eliminating a gateway type error by using the proxy server is proposed. The solution effectively eliminates the stability problem occurring in directly accessing to the Internet and increases the reliability of accessing the Internet. Further, when there is network congestion among some network operators, the proxy server solution of the present application can effectively speed up the access to the Internet and reduce the time for the user to access the Internet by using the proxy server to forward the request, thereby improving user experience of accessing mobile Internet.

Figure 6:
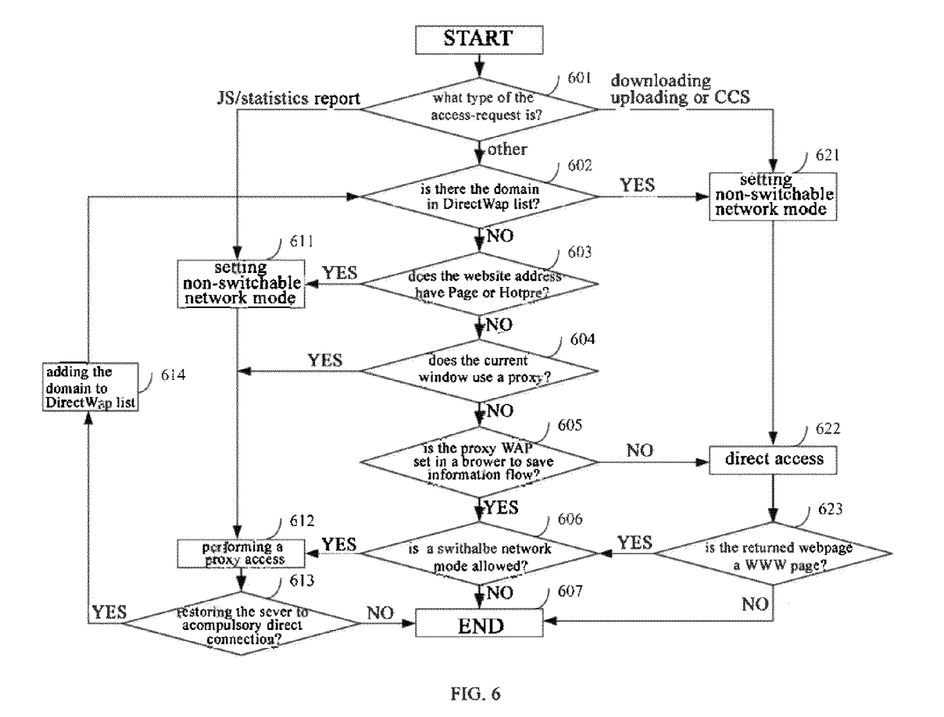
FIG. 6 is a specific flow chart of the Internet access method according to the embodiment of the present application.

FIG. 6 is a specific flow chart of the Internet access method according to the embodiment of the present application. The flow chart illustrates how to determine whether or not the terminal can access the second server via the first sever or whether or not the terminal need use the proxy server to access the second server. As shown in FIG. 6, the process comprises the following steps.

At step 601, the type of the webpage access-request is ascertained. If the webpage access-request is a type of a character string (JS, Javascript)/statistics report or the like, the process proceeds to step 611. If the webpage access-request is a type of downloading, uploading or CSS, the process proceeds to step 621; and if the webpage access-request is other types, the process proceeds to step 602.

At step 601, the other types include Get, Post, picture and so on. If the webpage access-request is the type of a character string (JS, Javascript)/statistics report or the like, it indicates that the terminal may access the second server via the proxy server. However, it is needed to further ascertain whether or not a non-switchable network mode is set, so as to determine whether or not the proxy server is needed to access the second server such as WAP server or the like. If the webpage access-request is the type of downloading, uploading or CSS type, it indicates that accessing the second server does not need the proxy server. If the webpage access-request is other type, it is also needed to further determine whether or not the proxy server is needed to access the second server.

At step 602, whether or not the domain to be accessed is listed in the direct access domain (DirectWap) list is determined. If the domain to be accessed is listed in the DirectWap list, the process proceeds to step 621; otherwise, the process proceeds to step 603.

At step 602, if the domain to be accessed is in the Direct-Wap list, it indicates that the proxy server is not needed to access the second server.

At step 603, whether or not the website address has a Page or Hotpre is determined. If the website address has a Page or Hotpre, the process proceeds to step 611; otherwise, the process proceeds to step 604.

At step 603, if the website address has a Page or Hotpre, it indicates that a backend transfer is needed.

At step 604, whether or not the current window uses a proxy is determined. If the current window uses the proxy, the process proceeds to step 612; otherwise, the process proceeds to step 605.

At step 604, if a new window is open, it indicates that the current window does not use the proxy. If the current window uses the proxy, it indicates that the terminal needs the proxy server to access the second server.

At step 605, whether or not the proxy WAP saving flow rate is set in the browser is determined. If yes, the process proceeds to step 606; otherwise, the process proceeds to step 622.

At step 606, whether or a network switch mode is allowed is determined. If a network switch mode is allowed, the process proceeds to step 612; otherwise, the process proceeds to step 607.

At step 607, the process ends.

At step 611, a non-switchable network mode is set.

In step 611, setting the non-switchable network mode indicates that accessing the second server needs the proxy server.

At step 612, a proxy access is carried out.

At step 613, whether or not the first server restores a compulsory direct connection is determined. If yes, the process proceeds to step 614; otherwise, the process proceeds to step 607.

In step 613, the compulsory direct connection indicates that the first server can communicates with the second server without using the proxy server.

At step 614, the domain of the second server is added in the DirectWap list. The process goes back to step 602.

At step 621, a non-switchable network mode is set.

At step 622, a direct connection access is performed.

At step 622, the direct connection access indicates that the terminal device such as the mobile terminal can communicate with the second server without using the proxy server.

At step 623, whether or not the returned webpage is the WWW page is determined. If yes, the process proceeds to step 606; otherwise, the process proceeds to step 607.

In step 623, if the webpage is the WWW page, it is needed to further ascertain whether or not a non-switchable network mode is set, so as to determine whether or not the proxy server is needed to access the second server.

From the description above, in the embodiment according to the present application, it is determined whether or not accessing the second server needs the proxy server in different conditions. To do this, when the first webpage access-request cannot reach the destination, a solution for eliminating a gateway type error by using the proxy server is proposed. The solution effectively eliminates the stability problem occurring in directly accessing to the Internet and increases the reliability of accessing the Internet. Further, when there is network congestion among some network operators, the solution can effectively speed up the access to the Internet and reduce the time for the user to access the Internet by using the proxy server to forward the request, thereby improving user experience of accessing mobile Internet.

The person in the art can understand that the entire processes or part thereof described above may be implemented by a computer program instructing relevant hardware. Said program may be stored in a computer-readable storage medium, and the processes according to the method of the embodiment above can be implemented when the program is executed. Said storage medium would include a magnetic disk, a CD (compact disc), a read-only memory (ROM), diskette, a hard disk, a random access memory (RAM) or a Random Access Memory (RAM).

The descriptions of the various embodiments of the present invention have been presented only for purposes of illustration, but are not intended to be exhaustive or limited to the embodiments disclosed. Many modifications and variations will be apparent to those of ordinary skill in the art without departing from the scope and spirit of the described embodiments.

The invention claimed is:

1. A terminal, comprising:
   at least one processor;
   at least one memory, the memory comprising a webpage access-request module, a domain access failure management module, and a webpage access-request processing module, wherein
   the webpage access-request module is configured to transmit a first webpage access-request to a second server via a first server, the first webpage access-request comprising address information of a webpage to be accessed;
   the domain access failure management module is configured to package the address information of a webpage to be accessed into a second webpage access-request whose destination address is an address of a proxy server when the terminal confirms the webpage access has failed and transmit the second webpage access-request to the second server via the first server and the proxy server; and
   the webpage access-request processing module is configured to receive a by the second server via the proxy server and the first server and present the returned webpage content,
   wherein,
   the domain access failure management module is further configured to store the domain information of destination website included in the first webpage access-request after the first webpage access-request is transmitted through a direct connection way and a prompt message that a service is not available is received;
   the webpage access-request processing module is further configured to, when the first webpage access-request is issued, query whether or not the domain access failure management module stores domain information corresponding to the first webpage access-request, and if the domain access failure management module stores the domain information, the webpage access-request processing module packages the address information of the webpage to be accessed into the second webpage access-request whose destination address is the address of the proxy server; otherwise, the webpage access-request processing module packages the address information of the webpage to be accessed, as destination address information, into the first webpage access-request.

2. The terminal according to claim 1, wherein the domain access failure management module is further configured to clear stored domain information of destination websites at a predetermined time or when a browser of the terminal quits the access to the network.

3. The terminal according to claim 1, wherein the memory further comprises a proxy domain management module, wherein
   the proxy domain management module is configured to, when the terminal is powered on, read a proxy domain white list from an external configured server and store the read white list;
   the webpage access-request processing module is further configured to, when the first webpage access-request is issued, query whether or not domain information corresponding to the first webpage access-request is included in the proxy domain white list of the proxy domain management module, and if domain information corresponding to the first webpage access-request is included in the proxy domain white list, the webpage access-request processing module packages the address information of the webpage to be accessed into the second webpage access-request whose destination address is the address of the proxy server; otherwise, the webpage access-request processing module packages the address information of the webpage to be accessed, as the destination address, into the first webpage access-request.

4. The terminal according to claim 3, wherein the webpage access-request processing module performs the query in a Fuzzy matching mode.

5. The terminal according to claim 1, wherein the memory further comprises a direct access domain management module, wherein
   the direct access domain management module is configured to, when the first webpage access-request is transmitted in a direct connection way and relevant webpage content information is received, store the domain information of destination website included in the first webpage access-request in a direct access domain white list;
   the webpage access-request processing module is further configured to, when the first webpage access-request is issued, query whether or not the direct access domain management module stores domain information corresponding to the first webpage access-request, and if the direct access domain management module does not store the domain information, the webpage access-request processing module packages the address information of the webpage to be accessed into the second webpage access-request whose destination address is the address of the proxy server; otherwise, the webpage access-request processing module packages the address information of the webpage to be accessed, as the destination address information, into the first webpage access-request.

* * * * *